Patented Sept. 17, 1946

2,407,946

UNITED STATES PATENT OFFICE 2,407,946

COPOLYMERIZATION OF VINYL COMPOUNDS

Edgar C. Britton and Walter J. Le Fevre, Midland, Mich., assignors to The Dow Chemical Company, Midland, Mich., a corporation of Michigan No Drawing. Application May 6, 1944, Serial No. 534,530

14 Claims. (Cl. 260—84)

This invention concerns an improved method of preparing copolymers of readily polymerizable organic compounds each containing the radical:

Such polymerizable compounds are hereinafter referred to as vinyl and vinylidene compounds.

A copending application of J. W. Britton and R. C. Dosser, Serial No. 351,222, filed August 3, 1940, discloses certain new and exceptionally active complex catalysts for the polymerization of vinyl and vinylidene compounds and a method of polymerizing vinyl halides by means of such catalysts. The latter comprise as essential ingredients an acid, a peroxide, and a ferric salt of an inorganic acid.

However, in U. S. Patents 2,333,633 and 2,333,635 we have shown that such complex catalyst, although effective in promoting the polymerization of a wide variety of vinyl and vinylidene compounds is unusually sensitive to the particular combinations of vinyl or vinylidene compounds and the reaction medium employed and that in order to obtain most rapid polymerization when using the catalyst the kind of reaction medium must be changed in going from the treatment of one vinyl or vinylidene compound to the treatment of another. For instance, the polymerization of vinyl cyanide with such catalyst occurs far more rapidly when carried out in the presence of aqueous methanol as a mutual solvent for the vinyl cyanide and catalyst than when attempted in an aqueous emulsion of the vinyl cyanide. In contrast, the polymerization of vinylidene chloride, i. e. asymmetric dichloroethylene, with the catalyst takes place more rapidly when carried out in an aqueous emulsion of the vinylidene chloride and catalyst than when carried out in an aqueous methanol solution. Accordingly, in order to obtain best results when polymerizing individual vinyl or vinylidene compounds with these catalysts, a suitable medium must be selected.

We have found that such deliberate choice of a suitable reaction medium is not required when employing the new complex catalysts to promote the copolymerization of two or more vinyl and/or vinylidene compounds with one another. In fact, such catalytic copolymerization may frequently be carried out satisfactorily in the absence of solvents other than the polymerizable compounds themselves. The explanation for this phenomena is not known with certainty, but apparently mixtures of two or more vinyl or vinylidene compounds are capable of simultaneously dissolving or absorbing all of the essential ingredients of the complex catalyst, e. g. to form a true, or a colloidal, solution of the catalyst ingredients. Most individual vinyl or vinylidene compounds do not possess this property except in the presence of a mutual solvent for the polymerizable compound and the catalyst.

The presence of a liquid medium is usually advantageous even when copolymerizing two or more vinyl or vinylidene compounds with the complex catalyst, but the selection of a suitable medium is less difficult when carrying out such copolymerization than when polymerizing a single vinyl or vinylidene compound with the catalyst.

We have further found that when the copolymerization of different vinyl and/or vinylidene compounds is carried out using a complex catalyst comprising an acid, a peroxygen compound and a ferric salt of an inorganic acid to promote the reaction, the molecular ratio between the different polymerizable compounds making up the copolymer product corresponds more closely to the ratio in which said compounds were employed as reactants than when the copolymerization is carried out under otherwise similar conditions, except that the ferric salt (employed as a catalyst ingredient) is omitted.

As hereinbefore indicated, the complex catalysts employed in the present process consist essentially of an acid, a peroxygen compound capable of supplying nascent oxygen to the polymerization mixture, and a ferric salt of an inorganic acid. The kinds and relative proportions of acid, peroxygen compound, and ferric salt may be varied quite widely. However, there are definite limits as to the proportions of acid or ferric salt which should be employed in order to obtain a strong catalytic effect.

Any acid capable of rendering the reaction mixture sufficiently acidic, e. g. a mineral acid such as nitric acid, hydrochloric acid, sulphuric acid, etc., may be employed as the acid ingredient of the catalyst. In most instances nitric acid is preferred, since it appears to be somewhat more effective than the other acids. It is important that the acid be present in amount sufficient to give the polymerization mixture a pH value of less than 3, since the activity of the complex catalyst decreases sharply with increase of the pH value above 3. The acid is preferably used in amount sufficient to give the reaction mixture a pH value between 1.5 and 3.

As the peroxygen ingredient of the catalyst, hydrogen peroxide is preferred. However, other peroxygen compounds such as benzoyl peroxide, sodium perborate, peracetic acid, or metal peroxides such as barium, or sodium peroxide which will react with the acid to form hydrogen peroxide in situ may be used. Between 0.002 and 0.2 mole of peroxide is usually employed per mole of the polymerizable compounds, but the peroxide may be used in smaller or considerably larger proportions if desired. The presence of a large excess of a peroxygen compound over the amount necessary to obtain the catalytic effect is not detrimental.

Any ionizable iron salt of an inorganic acid may be used as an ingredient of the complex catalyst. The iron salt may be added as such or be formed in situ within the polymerization mixture, e. g. by adding the iron as ferric oxide and reacting the latter with a portion of the acid added as a catalyst ingredient. Examples of suitable ferric salts are ferric nitrate, ferric chloride, ferric sulphate, ferric bromide, etc. The ferric salt is usually employed in amount such that its iron content corresponds to between 0.0001 and 0.05 per cent of the combined weight of the vinyl and/or vinylidene compounds. However, it may be used in smaller or in somewhat larger proportions if desired.

From the foregoing it will be seen that the relative proportions of the essential catalyst ingredients may be varied over wide ranges. However, in most instances we prefer to employ the ferric salt and the peroxide in proportions corresponding to between 0.000001 and 0.0004 gram atom of iron (in the ferric salt) per mole of the peroxide.

As hereinbefore stated, the copolymerization of two or more vinyl and/or vinylidene compounds with the above-described complex catalyst may be carried out in the absence of any medium other than the polymerizable compounds themselves, but is advantageously carried out either in the presence of a solvent for the polymerizable compounds and the catalyst or in aqueous emulsion. In any instance it is preferably, though not necessarily, carried out in a closed reactor or in contact with an inert atmosphere, e. g. nitrogen or carbon dioxide, so as to avoid possible discoloration of the product by air. When operating without an added reaction medium, the several catalyst ingredients and the polymerizable compounds in the proportions hereinbefore stated are mixed and the mixture is brought to and maintained at a polymerizing temperature until the reaction is substantially complete. The temperature required for rapid polymerization varies somewhat depending upon the particular polymerizable compounds used, but in most instances the catalytic copolymerization occurs rapidly at temperatures between 20° and 100° C. and in some instances it may be carried out at temperatures as low as −10° C. It may, of course, be carried out at temperatures up to the decomposition point of the product, e. g. at 150° C. or higher.

When carrying the copolymerization out in solution, the vinyl and/or vinylidene compounds and the essential catalyst ingredients in the proportions hereinbefore stated are dissolved in a solvent and the solution is brought to a polymerizing temperature, e. g. usually to a temperature between 20° and 100° C. As the solvent, aqueous methanol of between 60 and 90 per cent by weight concentration is usually employed, but other solvents for the polymerizable compounds and the catalyst, such as dioxane, acetone, aqueous ethanol, etc., may be used. After completing the polymerization, the copolymer is separated in any of the usual ways, e. g. by adding water to precipitate the product when a water-soluble solvent has been used as the reaction medium, or by distilling the solvent from the product, preferably under vacuum. In many instances, the copolymer products solidify as they are formed and may be separated mechanically, e. g. by decantation or filtration.

When conducting the catalytic copolymerization in aqueous emulsion, the polymerizable compounds and catalyst ingredients are employed in the respective proportions hereinbefore stated and the polymerization is preferably carried out at temperatures within the ranges hereinbefore given. The emulsion is prepared by mixing the polymerizable compounds and the catalyst ingredients with an aqueous solution of an emulsifying agent and agitating the mixture until it is emulsified. The identity of the emulsifying agent is of little importance, but it must, of course, be one capable of forming stable emulsions with the acidic mixtures employed. A variety of emulsifying agents having the property of forming stable emulsions of organic compounds with dilute aqueous acids are well known. Among the various emulsifying agents which may be used are egg albumen and alkali metal sulphonates of aliphatic and alkyl-aromatic hydrocarbons of high moleculr weight. Nopco (a sodium salt of sulphonated sperm oil) is particularly well adapted to use as the emulsifying agent.

After completing the copolymerization in emulsion, the emulsion is broken in any of the usual ways, e. g. by heating the same, or by adding methanol, ethanol, propanol, acetone, ammonia, or water-soluble salts such as sodium chloride, whereby the copolymer is precipitated, usually as a powder. The precipitate is separated from the liquor, washed free of adhering mother liquor and dried.

The following table describes the operating conditions employed and the results obtained in a number of tests on the copolymerization of vinyl and/or vinylidene compounds with one another in the presence of the complex catalysts. Certain of the tests were carried out in the absence of any medium other than the polymerizable compounds themselves; others were carried out in aqueous methanol solutions; and still others were carried out in aqueous emulsion using Nopco (the sodium salt of sulphonated sperm oil) in amount corresponding to 10 per cent of the total weight of the polymerizable compounds as the emulsifying agent. For purpose of comparison, the table includes not only the experiments wherein the copolymerization was carried out in the presence of the complex catalyst, comprising an acid, a peroxide, and a ferric compound, which is required by the invention, but also other experiments wherein the acid and peroxide were used, but the ferric compound was omitted. In all of the experiments, regardless of how they were carried out, hydrogen peroxide in amount corresponding to 2 per cent of the total weight of the polymerizable compounds and nitric acid in amount sufficient to reduce the pH value of the mixture to approximately 2, were present. In those experiments wherein a ferric compound also was present, ferric chloride was used in amount corresponding to 0.004 per cent of the weight of the entire mixture. Each copolymerization was carried out by heating the reaction mixture in a closed container under the polymerizing conditions stated. The table names and gives the proportions, in parts by weight, of the vinyl or vinylidene compounds and the liquid medium employed, indicates whether or not a ferric compound, i. e. ferric chloride, was present in the mixture, gives the conditions of time and temperature employed in effecting each polymerization and gives the per cent yield of polymerized product, based on the vinyl and vinylidene compounds employed.

Table

| Run No. | Nature of run | Medium | | Polymerizable compounds | | | | FeCl₃ present | Polym. conditions | | Yield, per cent |
|---|---|---|---|---|---|---|---|---|---|---|---|
| | | Kind | Parts | Kind | Parts | Kind | Parts | | Temp., °C. | Time, hrs. | |
| 1 | No medium | None | | Vinylidene chloride | 50 | Vinyl cyanide | 50 | No | 40 | 7 | 15 |
| 2 | ___do___ | ___do___ | | ___do___ | 50 | ___do___ | 50 | Yes | 40 | 7 | 27.5 |
| 3 | In solution | 85% conc. CH₃OH | 50 | Vinyl chloride | 25 | ___do___ | 25 | No | 40 | 11 | Trace |
| 4 | ___do___ | ___do___ | 50 | ___do___ | 25 | ___do___ | 25 | Yes | 40 | 11 | 80.5 |
| 5 | ___do___ | ___do___ | 50 | ___do___ | 7.5 | ___do___ | 42.5 | Yes | 40 | 11 | 71.0 |
| 6 | In emulsion | H₂O | 75 | ___do___ | 21.25 | Methyl methacrylate | 3.75 | No | 40 | 17 | 16 |
| 7 | ___do___ | H₂O | 75 | ___do___ | 21.25 | ___do___ | 3.75 | Yes | 40 | 17 | 92 |
| 8 | ___do___ | H₂O | 75 | ___do___ | 12.5 | ___do___ | 12.5 | Yes | 40 | 17 | 95 |
| 9 | ___do___ | H₂O | 75 | Vinylidene chloride | 21.25 | ___do___ | 3.75 | No | 40 | 17 | 57 |
| 10 | ___do___ | H₂O | 75 | ___do___ | 21.25 | ___do___ | 3.75 | Yes | 40 | 17 | 100 |
| 11 | ___do___ | H₂O | 75 | ___do___ | 12.5 | ___do___ | 12.5 | Yes | 40 | 17 | 100 |

In the foregoing table, runs Nos. 2, 4, 5, 7, 8, 10, and 11 show that the complex catalyst comprising an acid, a peroxide, and a ferric compound is effective in promoting the copolymerization of vinyl and/or vinylidene compounds with one another even though the kinds of polymerizable compounds employed and the other polymerizing conditions be varied widely. Comparisons of run 1 with 2, of run 3 with run 4, of run 6 with run 7, and of run 9 with run 10 demonstrate that said complex catalyst (which comprises a ferric compound) is far more effective than is a mixture of only the acid and peroxide in promoting the copolymerization. Other vinyl and vinylidene compounds which may advantageously be copolymerized with one another in the presence of the complex catalyst are methyl methacrylate and vinyl cyanide; vinyl chloride and vinyl acetate; vinylidene chloride and methyl alpha-methyl-vinyl ketone, etc. The complex catalyst is apparently effective in promoting the copolymerization regardless of the identity of the vinyl or vinylidene compounds used in the reaction.

This application is a continuation-in-part of our copending application Serial No. 351,222, filed August 3, 1940.

Other modes of applying the principle of our invention may be employed instead of those explained, change being made as regards the materials employed, provided the ingredients stated by any of the following claims or the equivalent of such stated ingredients be employed.

We therefore particularly point out and distinctly claim as our invention:

1. In a method wherein different polymerizable organic compounds, each containing the radical:

are copolymerized, the step of catalyzing the reaction by carrying it out in the presence of a peroxygen compound, a ferric salt of an inorganic acid in amount having an iron content corresponding to between about 0.0001 and about 0.05 per cent of the combined weight of the polymerizable organic compounds, and an acid in amount sufficient to give the polymerization mixture a pH value between about 1.5 and about 3, the peroxygen compound, ferric salt and acid each being dispersed within the polymerization mixture.

2. In a method wherein different polymerizable organic compounds, each containing the radical:

are copolymerized, the step of catalyzing the polymerization reaction by carrying it out in the presence of a minor amount of a dispersed complex catalyst consisting essentially of a peroxide, a ferric salt of an inorganic acid in amount having an iron content corresponding to between about 0.0001 and about 0.05 per cent of the combined weight of the polymerizable organic compounds and an acid in amount sufficient to give the polymerization mixture a pH value between 1.5 and 3.

3. The method as described in claim 2, wherein the peroxide is hydrogen peroxide.

4. The method as described in claim 2, wherein the peroxide is hydrogen peroxide and the acid is nitric acid.

5. In a method wherein different polymerizable organic compounds, each containing the radical:

are copolymerized, the step of carrying the polymerization out in the presence of a dispersed complex catalyst consisting essentially of an acid in amount sufficient to give the polymerization mixture a pH value between 1.5 and 3, between 0.002 and 0.2 mole of a peroxide per mole of the polymerizable compounds, and a ferric salt of an inorganic acid in amount such that its iron content corresponds to between 0.0001 and 0.05 per cent of the combined weight of the polymerizable compounds.

6. In a method wherein different polymerizable organic compounds, each containing the radical:

are copolymerized while dissolved in a solvent, the step of catalyzing the polymerization by carrying it out in the presence of a dispersed complex catalyst consisting essentially of a peroxide, a ferric salt of an inorganic acid in amount having an iron content corresponding to between about 0.0001 and about 0.05 per cent of the combined weight of the polymerizable organic compounds, and an acid in amount sufficient to give the polymerization mixture a pH value between about 1.5 and about 3.

7. The method which comprises dissolving in an inert solvent different polymerizable organic compounds, each containing the radical:

and a minor amount of a complex catalyst consisting essentially of hydrogen peroxide, a ferric salt of an inorganic acid in amount having an iron content corresponding to between about 0.0001 and about 0.05 per cent of the combined weight of the polymerizable organic compounds, and an acid in amount sufficient to give the polymerization mixture a pH value between about 1.5 and about 3, and copolymerizing the polymerizable compounds while in said solution.

8. The method which comprises dissolving in aqueous methanol different polymerizable organic compounds, each of which contains the radical:

and a minor amount of a complex catalyst consisting essentially of hydrogen peroxide, a ferric salt of an inorganic acid in amount having an iron content corresponding to between 0.0001 and 0.05 per cent of the combined weight of the polymerizable organic compounds, and nitric acid in amount sufficient to give the polymerization mixture a pH value between 1.5 and 3, copolymerizing the polymerizable compounds while in said solution and separating the polymerized product.

9. The method which comprises forming an aqueous emulsion containing in dispersed form different polymerizable organic compounds, each of which contains the radical:

a minor amount of peroxide, a ferric salt of an inorganic acid in amount having an iron content corresponding to between 0.0001 and about 0.05 per cent of the combined weight of the polymerizable organic compounds, and an acid in amount sufficient to give the emulsion a pH value between about 1.5 and about 3, and copolymerizing the polymerizable compounds while in the emulsion.

10. The method which comprises forming an aqueous emulsion containing in dispersed form different polymerizable organic compounds, each of which contains the radical:

between 0.002 and 0.2 molecular equivalent of hydrogen peroxide per mole of the polymerizable compounds, a ferric salt of an inorganic acid in amount having an iron content corresponding to between 0.0001 and 0.05 per cent of the combined weight of the polymerizable compounds and an acid in amount sufficient to give the emulsion a pH value between 1.5 and 3 and copolymerizing the poylmerizable compounds while in the emulsion.

11. The method which comprises polymerizing a mixture of methyl methacrylate and vinylidene chloride in the presence of a minor amount of a dispersed complex catalyst consisting essentially of a peroxide, a ferric salt of an inorganic acid in amount having an iron content corresponding to between 0.0001 and 0.05 per cent of the combined weight of the methyl methacrylate and vinylidene chloride, and an acid in amount sufficient to give the mixture a pH value between 1.5 and 3.

12. The method which comprises forming an aqueous emulsion which contains in dispersed form methyl methacrylate, vinylidene chloride, a minor amount of a peroxide, a ferric salt of an inorganic acid in amount having an iron content corresponding to between 0.0001 and 0.05 per cent of the combined weight of the methyl methacrylate and vinylidene chloride, and an acid in amount sufficient to give the emulsion a pH value between 1.5 and 3, copolymerizing the methyl methacrylate and vinylidene chloride while in the emulsion, and separating the polymerized product.

13. The method which comprises copolymerizing vinylidene chloride and vinyl cyanide in the presence of a minor amount of a peroxide, a ferric salt of an inorganic acid in an amount such that its iron content corresponds to between 0.0001 and 0.05 per cent of the combined weight of the vinylidene chloride and vinyl cyanide, and an acid in amount sufficient to give the mixture a pH value between 1.5 and 3, the peroxide, ferric salt and acid being dispersed together with the compounds being polymerized.

14. The method which comprises forming an aqueous emulsion which contains vinylidene chloride and vinyl cyanide, a minor amount of a peroxide, a ferric salt of an inorganic acid in amount such that its iron content corresponds to between 0.0001 and 0.05 per cent of the combined weight of the vinylidene chloride and vinyl cyanide, and an acid in amount sufficient to give the emulsion a pH value between 1.5 and 3, and copolymerizing the vinylidene chloride and vinyl cyanide while in said emulsion.

EDGAR C. BRITTON.
WALTER J. LE FEVRE.